(12) United States Patent
Hall et al.

(10) Patent No.: US 10,904,949 B2
(45) Date of Patent: Jan. 26, 2021

(54) BRIDGE FOR WIRELESS COMMUNICATION

(71) Applicant: Hall Labs LLC, Provo, UT (US)

(72) Inventors: David R. Hall, Provo, UT (US); Dustin Clouse, Springville, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/360,760

(22) Filed: Mar. 21, 2019

(65) Prior Publication Data

US 2020/0305234 A1 Sep. 24, 2020

(51) Int. Cl.
| | |
|---|---|
| *H04W 88/16* | (2009.01) |
| *H04W 88/04* | (2009.01) |
| *H04W 4/14* | (2009.01) |
| *H04W 88/06* | (2009.01) |
| *H04W 84/18* | (2009.01) |
| *H04W 4/80* | (2018.01) |

(52) U.S. Cl.
CPC ............. *H04W 88/16* (2013.01); *H04W 4/14* (2013.01); *H04W 88/04* (2013.01); *H04W 88/06* (2013.01); *H04W 4/80* (2018.02); *H04W 84/18* (2013.01)

(58) Field of Classification Search
CPC ........ H04W 88/16; H04W 4/14; H04W 88/06
See application file for complete search history.

(56) References Cited

U.S. PATENT DOCUMENTS

| | | | | |
|---|---|---|---|---|
| 2007/0280192 | A1* | 12/2007 | Yagyu | H04W 40/02 370/349 |
| 2013/0128778 | A1* | 5/2013 | Bennett | H04W 36/08 370/277 |
| 2013/0223324 | A1* | 8/2013 | Somasundaram | H04W 16/26 370/315 |
| 2013/0336202 | A1* | 12/2013 | Oh | H04W 84/045 370/315 |
| 2014/0169222 | A1* | 6/2014 | Cohen | H04L 12/462 370/255 |
| 2015/0207724 | A1* | 7/2015 | Choudhury | H04L 45/42 370/255 |
| 2017/0188337 | A1* | 6/2017 | Kogure | H04W 72/04 |
| 2018/0176121 | A1* | 6/2018 | Jayaraman | H04L 12/185 |
| 2018/0248983 | A1* | 8/2018 | Mohebbi | H04L 69/08 |
| 2019/0053180 | A1* | 2/2019 | Lalam | H04L 7/10 |
| 2019/0104074 | A1* | 4/2019 | Ayandeh | H04L 47/2441 |
| 2019/0327134 | A1* | 10/2019 | Jha | H04L 41/12 |
| 2020/0008127 | A1* | 1/2020 | Ohtsuji | H04W 40/22 |

\* cited by examiner

*Primary Examiner* — Deepa Belur

(57) ABSTRACT

A system for bridging wireless communications is disclosed. The system for bridging wireless communications includes a first mobile device that is outside a coverage area of a first radio access technology (RAT), a second mobile device that is within the coverage area of the first RAT, a third device that is within the coverage area of the first RAT, a first bridging device paired with and communicating with the first mobile communication device using a second RAT, and a second bridging device paired with and communicating with the first bridging device using a third RAT and paired with and communicating with the second mobile communication device using a fourth RAT, whereby the first mobile device communicates with the third device, even when the first mobile device cannot communicate directly with the third communication device.

17 Claims, 10 Drawing Sheets

BRIDGE FOR WIRELESS COMMUNICATION

TECHNICAL FIELD

The described systems and methods are directed to bridging communications so that a device not within a coverage area of a network can still communicate with the network.

BACKGROUND

Different radio access technologies have different advantages and disadvantages. For example, some radio access technologies are particularly suited for short range communications (e.g., 0 to 100 meters (m)), such as Bluetooth, while other radio access technologies are particularly suited for medium range communications (e.g., 100 m to 20 kilometers (km)), such as cellular technologies (e.g., 3G, 4G, LTE, 5G NR), and yet other radio access technologies are particularly suited for long range communications (e.g., 1 km to 100 km), such as LoRaWAN utilizing the 900 Megahertz (MHz) frequency band.

Wireless communications are traditionally centered around a single radio access technology. This is typically because different radio access technologies use different protocols that are particularly adapted to the requirements and specific attributes of that particular radio access technology. As a result, different radio access technologies are generally not interoperable.

SUMMARY

In a first aspect, the disclosure provides a system for bridging wireless communications. The system for bridging wireless communications includes a first mobile device that is outside a coverage area of a first radio access technology (RAT), a second mobile device that is within the coverage area of the first RAT, a third device that is within the coverage area of the first RAT, a first bridging device paired with and communicating with the first mobile communication device using a second RAT, and a second bridging device paired with and communicating with the first bridging device using a third RAT and paired with and communicating with the second mobile communication device using a fourth RAT, whereby the first mobile device communicates with the third device, even when the first mobile device cannot communicate directly with the third communication device by any one of the first RAT, the second RAT, the third RAT, or the fourth RAT.

In a second aspect, the disclosure provides a system wherein the first RAT is different than the second RAT, and wherein the third RAT is different than that first RAT and the second RAT.

In a third aspect, the disclosure provides a system wherein the third RAT is LoRaWAN, and wherein the second RAT utilizes a 900-Megahertz (MHz) frequency band.

In a fourth aspect, the disclosure provides a system wherein the first RAT comprises a wide area network technology, wherein the wide area network technology is at least one of 3G, 4G, LTE, LTE-Advanced, and 5G NR.

In a fifth aspect, the disclosure provides a system wherein the second RAT and the fourth RAT are a same RAT, and wherein the same RAT is Bluetooth.

In a sixth aspect, the disclosure provides a method for bridging wireless communications is described. The method for bridging wireless communications includes receiving, by a first mobile device, a communication from a second mobile device via a plurality of bridge devices, the communication comprising a payload and a destination address, wherein the first mobile device communicates with one of the plurality of bridge devices over a first radio access technology (RAT), and wherein the plurality of bridge devices communicate with each other over a second RAT, generating a message for transmission over a third RAT based on the received payload and the received destination address, and transmitting the message over the third RAT.

In a seventh aspect, the disclosure provides a method wherein a first mobile device is within a coverage area of the third RAT, and wherein the second mobile device is outside of the coverage area of the third RAT.

In an eight aspect, the disclosure provides a method wherein the method further includes receiving a second message from a third mobile device, the second message comprising a payload and an originating address, determining that the originating address matches the destination address, wherein the third mobile device is associated with the destination address, generating a second communication based on the second message, and transmitting the second communication to the second mobile device via the plurality of bridge devices.

In a ninth aspect, the disclosure provides a method wherein the message is at least one of a short message service (SMS) message, a multimedia message service (MMS) message, a rich communications services (RCS) message, and an iMessage service.

In a tenth aspect, the disclosure provides a method wherein the first RAT is different than the second RAT, and wherein the third RAT is different than that first RAT and the second RAT.

In an eleventh aspect, the disclosure provides a method wherein the first RAT is Bluetooth.

In a twelfth aspect, the disclosure provides a method wherein the second RAT is LoRaWAN, and wherein the second RAT utilizes a 900 MHz band.

In a thirteenth aspect, the disclosure provides a method wherein the third RAT is at least one of 3G, 4G, LTE, and 5G NR.

In a fourteenth aspect, the disclosure provides a method wherein the payload has a maximum size of 140 octets.

In a fifteenth aspect, the disclosure provides for a mobile device for bridging wireless communications. The mobile device includes a processor, and memory in electronic communication with the processor, the memory storing instructions that when executed by the processor, cause the processor to: receive a communication from a second mobile device via a plurality of bridge devices, the communication comprising a payload and a destination address, wherein the mobile device communicates with one of the plurality of bridge devices over a first radio access technology (RAT), and wherein the plurality of bridge devices communicate with each other over a second RAT, generate a message for transmission over a third RAT based on the received payload and the received destination address, and transmit the message over the third RAT.

In a sixteenth aspect, the disclosure provides a mobile device wherein the mobile device is within a coverage area of the third RAT, and wherein the second mobile device is outside of the coverage area of the third RAT.

In a seventeenth aspect, the disclosure provides a mobile device wherein the instructions are further executable by the processor to: receive a second message from a third mobile device, the second message comprising a payload and an originating address, determine that the originating address matches the destination address, wherein the third mobile device is associated with the destination address, generate a second communication based on the second message, and transmit the second communication to the second mobile device via the plurality of bridge devices.

In an eighteenth aspect, the disclosure provides a mobile device wherein the message is at least one of a short message service (SMS) message, a multimedia message service (MMS) message, a rich communications services (RCS) message, and an iMessage service.

In a nineteenth aspect, the disclosure provides a mobile device wherein the first RAT is different than the second RAT, and wherein the third RAT is different than that first RAT and the second RAT.

In a twentieth aspect, the disclosure provides a mobile device wherein the payload has a maximum size of 140 octets.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
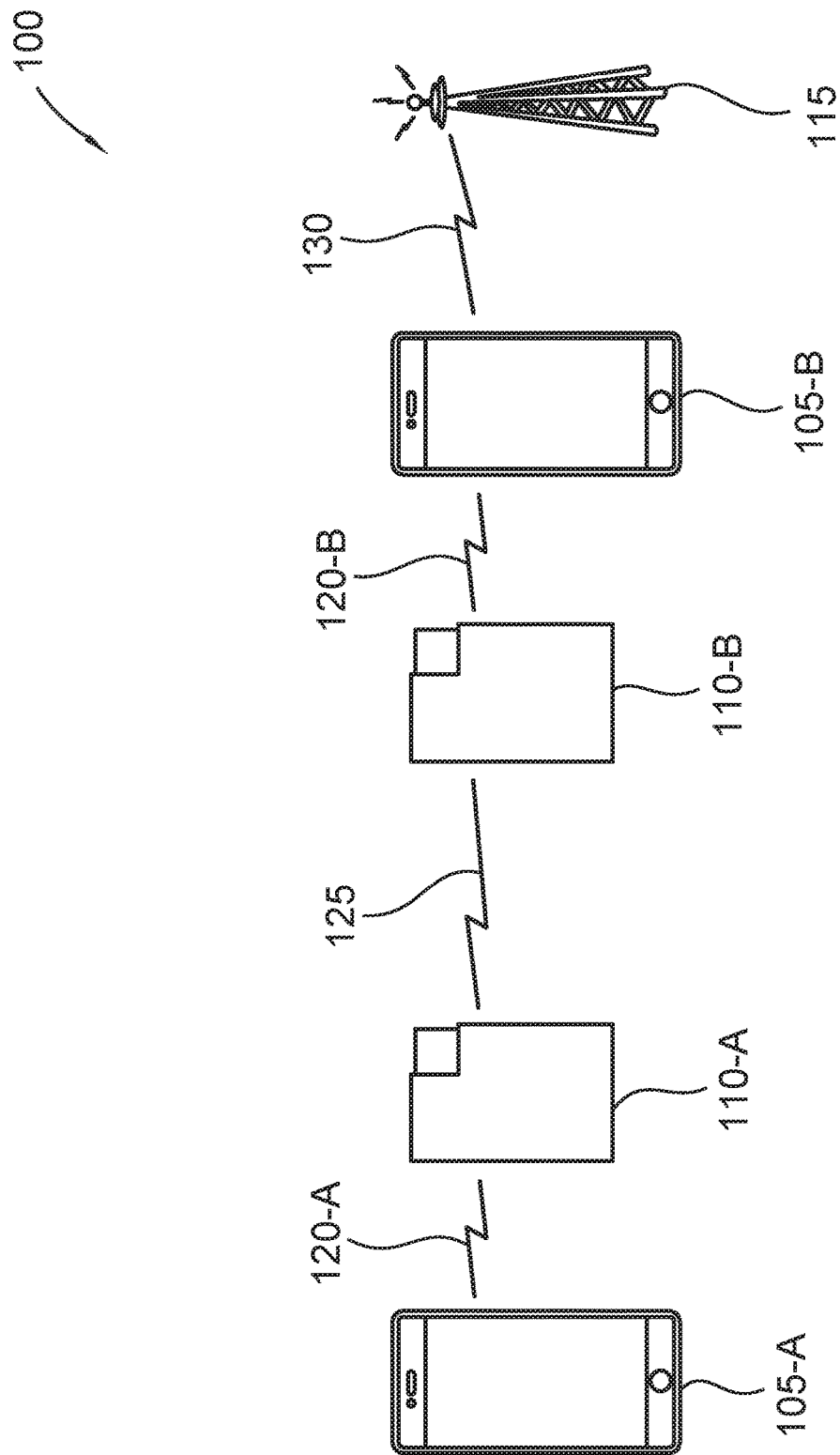
FIG. 1 is a block diagram illustrating one example of a wireless communication system utilizing the described systems and methods.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "3G", "4G", "LTE", "LTE-A", and "5G NR" are meant to refer to the respective standards defined by the $3^{rd}$ Generation Partnership Project (3GPP). It is understood that "LTE" is meant to refer to "Long Term Evolution", "LTE-A" is meant to refer to "LTE-Advanced", and "5G NR" is meant to refer to "5G New Radio".

As used herein, "cellular network" is meant to refer to any mobile telecommunications network using any of variety of standards including 3G, 4G, LTE, LTE-A, and 5G NR, as well as similar technologies, such as IEEE 802.16 "Wi-Max", Global System for Mobiles (GSM), and code division multiple access (CDMA).

As used herein, "personal radio service equipment" is meant to refer to personal communication devices using any of a variety of personal networking standards including Family Radio Service (FRS) devices, General Mobile Radio Service (GMRS) devices, devices using the 900 MHz industrial, scientific, and medical (ISM) frequency band, as well as similar technologies. Personal radio service equipment may use proprietary communication standards and/or may require specific configuration information.

Cellular networks have become ubiquitous with cellular network coverage generally extending across the globe. There still remains, however, large areas of land, usually in very remote places (e.g., backcountry, wilderness), that do not have cellular network coverage. Those that travel through these areas often bring their own personal radio service communication equipment, such as walkie-talkies (e.g., Family Radio Service (FRS) devices, General Mobile Radio Service (GMRS) devices, devices using the 900 MHz industrial, scientific, and medical (ISM) frequency band) for person to person communication. Unfortunately, these devices are the technologies that empower these communication devices are not interoperable with cellular networks.

It would be beneficial, however, to be able to bridge communications from personal radio service communication equipment to cellular networks so that a user outside of cellular network coverage could, using personal radio service communication equipment could interoperate with cellular networks.

The systems and methods described herein enable bridging of communications between a personal radio service communication network and a cellular network. That is, bridging communications from the personal radio service communication network to the cellular network and bridging communications from the cellular network to the personal radio service communication network.

In some embodiments, a mobile device that is configured to communicate via a cellular network may receive a message from a personal radio service communication device (via a Bluetooth connection or a Wi-Fi connection, for example) and may bridge the message, adapting it and repackaging it as necessary, to send the message over cellular network. Likewise, the mobile device may receive a message via the cellular network and may bridge the message, adapting it and repackaging it as necessary, to send the message to the personal radio service communication device (via a Bluetooth connection or a Wi-Fi connection, for example).

Using this bridging, a first mobile device that is outside the coverage area of a cellular network may communicate with a first personal radio service communication device (via a Bluetooth connection or a Wi-Fi connection, for example) to send a message over a personal radio service communication network. The first personal radio service communication device may use a proprietary communication protocol that limits communication to other personal radio service communication devices that are utilizing that proprietary communication protocol. The first personal radio service communication device may direct a message to a second personal radio service communication device (via a direct link or via one or more intermediate personal radio service communication devices that relay the message, for example). The second personal radio service communication device may communicate with a second mobile device (via a Bluetooth connection or a Wi-Fi connection, for example) that is within coverage of a cellular network. The second personal radio service communication device may send the message to the second mobile device. The second mobile device, using the systems and methods described herein may bridge the message so as to provide a communication link between the first mobile device (that is outside of the coverage area of the cellular network, for example) and the cellular network via the personal radio service communication network.

In one example, a pair of hikers could leave one of their mobile devices in their vehicle where it is within the coverage area of a cellular network (and connected to a big power supply such as the battery of the vehicle, for example). In addition, the pair of hikers could leave a personal radio service communication device in range (e.g., Bluetooth range, Wi-Fi range) of the mobile device (and connected to a big power supply such as the battery of the vehicle, for example). Meanwhile, the pair of hikers could take a second mobile device and a second personal radio service communication device with them as they begin hiking into areas outside of the coverage area of the cellular network. It is appreciated that the personal radio service devices may support ranges that exceed 50 miles point to point, thus allowing the hikes to travel great distances while still staying within personal radio service communication range of the personal radio service communication device that was left in the vehicle.

The pair of hikers may use the mobile device with them to compose a message (e.g., a text message) and send the message to the personal radio service communication device with them (via Bluetooth or Wi-Fi, for example), which sends the message over the personal radio service communication network to the personal radio service communication device within the vehicle (either directly or via one or more personal radio service communication devices, for example). The personal radio service communication device within the vehicle may send the message to the mobile device in the vehicle (via Bluetooth or Wi-Fi, for example) which, using the systems and methods described herein, may bridge the message into a short messaging service (SMS) message and send the SMS to a particular recipient via the cellular network. In some cases, the systems and methods described herein may repurpose an unused field (or unused bits within a used field, for example) to set a flag to indicate that the SMS was sent using the systems and methods described herein. It is appreciated that the SMS will be originating from the mobile device in the vehicle and that the systems and methods will need to identify SMS messages arriving at the mobile device in the vehicle and bridge (either selectively or all messages) to the personal radio service communication network and to the mobile device that is outside the coverage area of the cellular network.

When the mobile device that is within coverage of the cellular network receives an incoming SMS message, the systems and methods described herein may bridge that message, adapting it and reformatting it as needed to send that message to the mobile device that is not within coverage of the cellular network via the personal radio communication network (e.g., a pair of personal radio communication devices).

In some cases, the systems and methods described herein may save the destination address and identify incoming messages from that destination address to automatically bridge back through the personal radio service communication network to the originating mobile device. In other cases, the systems and methods described herein may bridge all incoming and outgoing messages to provide a bidirectional link between the The message that is original sent by the mobile device to the personal radio service communication device may include multiple parts including a text or data field, including the content that should be sent, as well as a destination address that the message should be sent to. In some cases, the destination address may be a phone number, an email address, or another identifiable address (e.g., text message address, instant messaging address, direct messaging address) associated with a recipient.

Although the examples described herein specifically refer to SMS messages, it is appreciated that systems and methods may be used using any messaging protocol, including SMS, MMS, RCS, iMessage, and the like.

Now referring to FIG. 1, FIG. 1 is a block diagram illustrating one example of a wireless communication system 100 utilizing the described systems and methods. The wireless communication system 100 includes a first mobile device 105-A, a second mobile device 105-B, a first personal radio service device 110-A, a second personal radio service device 110-B, and an enhanced Node B (eNB) 115 (e.g., cell tower, base station, providing access to the cellular network) that provides access to the cellular network.

The first mobile device 105-A may not be in the coverage area of the cellular network. The first mobile device 105-A may be connected to the first personal radio service device 110-A via a first radio access technology (RAT) 120-A. The first RAT 120-A may be a short-range personal area network (PAN) or wireless local area network (WLAN) technology such as Bluetooth and/or Wi-Fi.

The first personal radio service device 110-A may be connected to the second personal radio service device 110-B via a second RAT 125. The second RAT 125 may be a proprietary communication protocol that utilizes the 900 MHz frequency band. In some embodiments, the second RAT 125 may be LoRaWAN. Various examples of how the first personal radio service device 110-A may be connected to and may communicate with the second personal radio service device 110-B using LoRaWAN (and with mobile device 105-A, 105-B using Bluetooth, for example) are described in U.S. Pat. No. 10,206,081 and U.S. Patent Application Publication No. 2019-0018376, each of which is hereby incorporated herein by reference.

The second personal radio service device 110-B may be connected to the second mobile device via a third RAT 120-B. The third RAT 120-B may be a short-range personal area network (PAN) or wireless local area network (WLAN) technology such as Bluetooth and/or Wi-Fi. In some cases, the first RAT 120-A and the third RAT 120-B are the same RAT. For example, the first RAT 120-A and the third RAT 120-B may both be Bluetooth.

The second mobile device 105-B may be within a coverage area of the cellular network and may be coupled to the eNB 115 via a fourth RAT 130. The fourth RAT 130 may be a cellular network technology such as 3G, 4G, LTE, LTE-Advanced, 5G-NR, and the like. The second mobile device 105-B (e.g., user equipment (UE)) may communicate with the eNB 115 via the fourth RAT as is well known in the industry.

Typically, the first mobile device 105-A, which is not within a coverage area of a cellular network (e.g., the fourth RAT 130) would not be able to access the cellular network (the first mobile device 105-A would be isolated and unable to communicate via the cellular network. The systems and methods described herein provide an alternative communication path that enables the first mobile device 105-A to communicate with the cellular network.

In an exemplary embodiment, a user of the first mobile device 105-A may use an application on the first mobile device 105-A to write a message and to designate a recipient of the message. In some cases, the application may be a dedicated messaging application that is typically used for messaging when connected to a cellular network. In such cases, the described systems and methods may present as an alternative internet connection. In other cases, the application may be a proprietary application for communicating via the personal radio service network (e.g., send RAT 125).

The mobile device 105-A may send the message to the first personal radio service device 110-A via the first RAT 120-A. The first personal radio service device 110-A may repackage and/or reformat the message for transmission over the second RAT 125 and may send the message to the second personal radio service device 110-B via the second RAT 125.

The second personal radio service device 110-B may receive the message from the first personal radio service device 110-B (directly, or indirectly through one or more relays, for example) and may repackage and/or reformat the message for transmission over the third RAT 120-B and may send the message to the second mobile device 105-B via the third RAT 120-B.

The second mobile device 105-B may receive the message from the second personal radio service device 110-B and may repackage and/or reformat the message for transmission over the fourth RAT 130 and may send the message to the eNB 115 via the fourth RAT 130. In some cases, depending on the type of message that is being sent, the second mobile device 105-B formats and/or reformats the message as an SMS message. In other cases, the second mobile device 105-B formats and/or reformats the message as the appropriate data structure for the type of data/type of request that is associated with the message (such as an MMS message, an internet request/response, a packetized (i.e., TCP-IP) message, etc.).

The eNB 115 may receive the message from the second mobile device 105-B and may handle the message as if the message originated from the second mobile device 105-B. This means that any return communications, such as acknowledgments, responses, or requests are directed to the second mobile device 105-B regardless if the messaging originally from the first mobile device 105-A. Accordingly, the second mobile device 105-B may make a determination as to whether incoming messages should be bridged through the personal radio service network to the first mobile device 105-A or if the messages should not be bridged. In some cases, the second mobile device 105-B may identify a set of recipients addresses (e.g., phone numbers, destination addresses) that should be bridged. In some cases, the second mobile device 105-B may add a recipient to the list when the second mobile device 105-B receives a message directed to that recipient from the first mobile device 105-A. The second mobile device 105-B may identify the sender of a message, compare the sender to the list of stored recipients and may bridge the message to the first mobile device 105-A when the sender information matches a saved recipient information that is saved in the list of recipients to bridge.

When the second mobile device 105-B determines to bridge a message to the first mobile device 105-A, the second mobile device 105-B formats and/or reformats/re-packages a message received from the eNB 115 via the fourth RAT 140 so that it can be sent to the second personal radio service device 110-B via the third RAT 120-B. As discussed above, except in reverse order, the second personal radio service device 110-B may receive the message from the second mobile device 105-B and may format, reformat, and/or repackage the message so that it could be sent via the second RAT 125. The second personal radio system device 110-B may send the message to the first personal radio system device 110-A via the second RAT 125.

The first personal radio service device 110-A may receive the message from the second personal radio service device 110-B and may format, reformat, and/or repackage the message so that it could be sent via the first RAT 120-A. The first personal radio system device 110-A may send the message to the first mobile device 105-A via the first RAT 120-A. Thus, the first mobile device 105 may receive the message and may provide the message to the appropriate application so that the user may read and/or access the message.

Figure 2:
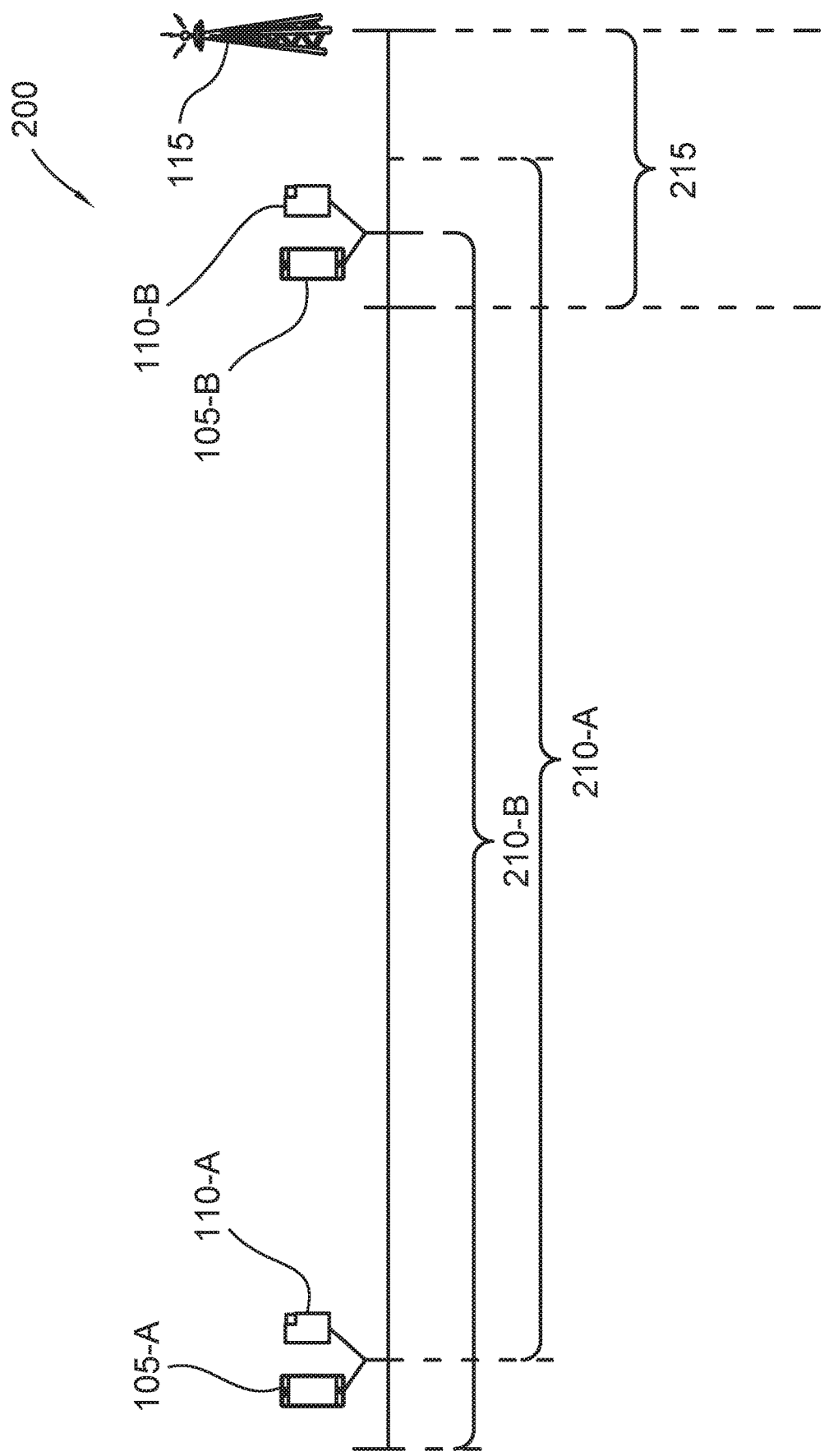
FIG. 2 is a block diagram illustrating exemplary ranges of the different RATs utilized in the described systems and methods.

FIG. 2 is a block diagram illustrating exemplary ranges 200 of the different RATs utilized in the described systems and methods. Shown with regard to the exemplary ranges 200 are the first mobile device 105-A, the first personal radio system device 110-A, the second personal radio system device 110-B, the second mobile device 105-B, and the eNB 115.

The first RAT (e.g., first RAT 120-A, between the first mobile device 105-A and the first personal radio system device 110-A) and the third RAT (e.g., third RAT 120-B, between the second mobile device 105-B and the second personal radio system device 110-B) have ranges that are too small to be adequately represented in the exemplary ranges 200. In general, the first RAT and third RAT utilize radio access technologies that are particularly suited for short range communications (e.g., 0 to 100 meters (m)), such as Bluetooth and Wi-Fi.

The second RAT (e.g., second RAT 125, between the first personal radio system device 110-A and the second personal radio system device 110-B) has a range that is particularly suited for long range communications (e.g., 1 km to 100 km), such as LoRaWAN utilizing the 900-Megahertz (MHz) frequency band. As shown, the range 210-A of the first personal radio service device 110-A may extend a long distance that encompasses the second personal radio service device 110-B. Similarly, as shown, the range 210-B of the second personal radio service device 110-B may extend a long distance that encompasses the first personal radio service device 110-A. With the ranges (e.g., 210-A and 210-B) of both the first personal radio system device 110-A and the second personal radio system device 110-B overlapping, the first personal radio system device 110-A and the second personal radio system device 110-B can communicate via the second RAT.

The fourth RAT (e.g., fourth RAT 130, between the second mobile device 105-B and the eNB 115) has a range that is particularly suited for medium range communications (e.g., 100 m to 20 kilometers (km)), such as cellular technologies (e.g., 3G, 4G, LTE, 5G NR). As shown, the range 215 of the eNB 115 utilizing the fourth RAT may extend a relatively shorter distance as compared to the ranges 210-A, 210-B of the personal radio system devices 110-A, 110-B utilizing the second RAT.

As shown in the exemplary ranges 200, the second personal radio system device 110-B may be within the coverage area (e.g., the range 215) of the eNB 115, while the first personal radio system device 110-A may be far outside of the coverage area of the eNB 115 (and other eNBs not shown, for example).

Figure 3:
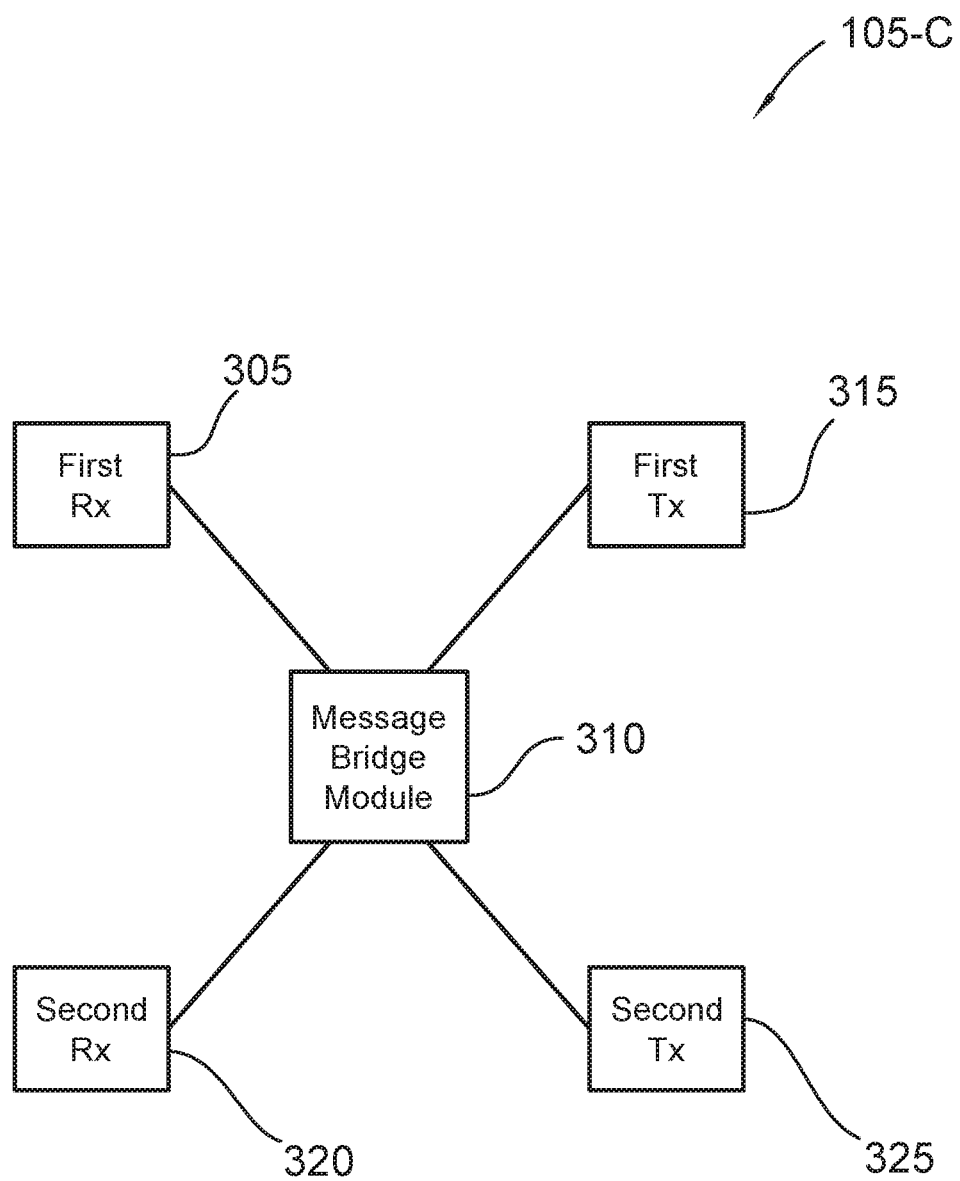
FIG. 3 is a block diagram illustrating one embodiment of a mobile device for implementing the described systems and methods.

FIG. 3 is a block diagram illustrating one embodiment of a mobile device 105-C for implementing the described systems and methods. The mobile device 105-C may be an example of each of the mobile devices 105 discussed previously (e.g., second mobile device 105-B). The mobile device 105-C includes a first receiver 305 and a first transmitter 315 for communicating via a first RAT (e.g., a medium range RAT, such as 3G, 4G, LTE, or 5G-NR), a second receiver 320 and a second transmitter 325 for communicating via a second RAT (e.g., a short range RAT, such as Bluetooth or Wi-Fi), and a message bridging module 310 for bridging messages between the first RAT and the second RAT.

The message bridge module 310 may receive a message via one of the RATs and may format, reformat, and/or repackage the message for transmission via the second RAT. In some embodiments, the message bridge module 310 may generate an SMS message based on a RAT specific message (e.g., a Bluetooth message, a Wi-Fi message) and/or may generate a RAT specific message (e.g., a Bluetooth message, a Wi-Fi message) based on an SMS message.

For example, the first receiver 305 may receive a SMS message via a first RAT and may provide the SMS message to the message bridge module 310. The message bridge module 310, upon receiving the SMS message, may generate a RAT specific message based on the information included in the SMS message and provide the RAT specific message to the second transmitter 325 for transmission via a second RAT. Similarly, the second receiver 320 may receive a RAT specific message via a second RAT and may provide the RAT specific message to the message bridge module 310. The message bridge module 310, upon receiving the RAT specific message, may generate an SMS message based on the information included in the RAT specific message and provide the SMS message to the first transmitter 315 for transmission via the first RAT.

Although the first receiver 305 and the first transmitter 315 are described as being separate devices, it is appreciated that these devices may be combined into a single transceiver device without departing from the scope of the described systems and methods. Similarly, the second receiver 320 and the second transmitter 325 are described as being separate devices, however, it is appreciated that these devices may be combined into a single transceiver device without departing from the scope of the described systems and methods.

Figure 4:
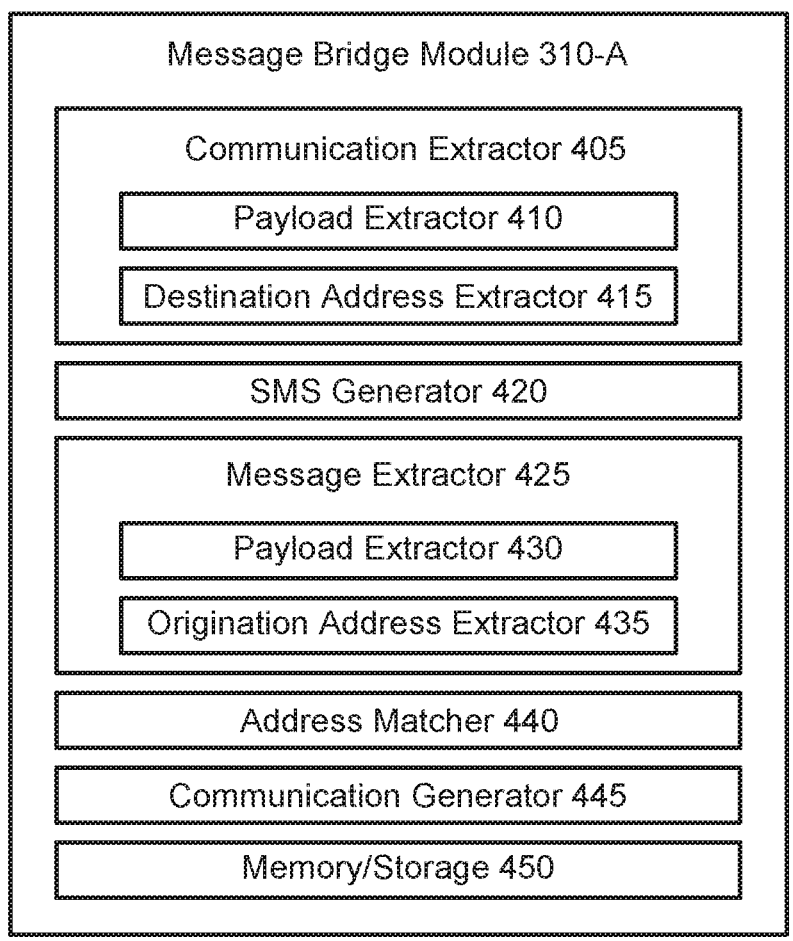
FIG. 4 is a block diagram illustrating one embodiment of a message bridge module.

FIG. 4 is a block diagram illustrating one embodiment of a message bridge module 310-A. The message bridge module 310-A is one example of the message bridge module 310 discussed with respect to FIG. 3. The message bridge module 310-A includes a communication extractor 405, a SMS generator 420, a message extractor 425, an address matcher 440, a communication generator 445, and memory/storage 450.

The communication extractor 405 may extract the information from a first communication. The communication extractor 405 includes a payload extractor 410 and a destination address extractor 415.

The payload extractor 410 may extract one or more data objects from a payload portion of the first communication. In some cases, the first communication may be a single message. In other cases, the first communication may include multiple messages that when combined carry a single payload. In some cases, the data object is a string of characters (up to 160 characters, for example). In other cases, the data object may be an image or a video clip. In yet other cases, the data object may be voice over IP (VOIP) data and/or session initiation protocol (SIP) data. Regardless of the data object, the payload extractor 410 may extract the one or more data objects for reformatting and repackaging the one or more data objects into an SMS message.

The destination address extractor 415 may extract a destination address associated with the payload from the first communication. In some cases, the destination address may be a fully numeric address (e.g., a phone number). In other cases, the destination address may be an alphanumeric address (e.g., an email address, text address, or uniform resource locator (URL)).

The SMS generator 420 may generate one or more short message service (SMS) messages using the extracted payload and the extracted destination address. Each SMS message may be generated to conform with the appropriate standards being used by the cellular network. It is appreciated that although SMS messages are used as the primary example, alternative messaging protocols (e.g., RCS, iMessage, MMS, instant messaging protocols, direct messaging protocols, etc.) may be used in place of SMS messages without departing from the scope of the described systems and methods. In particular, the SMS generator 420 may generate an SMS-SUBMIT message by formatting the destination address to be used as the DA field (address of the destination SME (i.e., network entity that can send/receive messages)) of the SMS-SUBMIT message and formatting the one or more data objects to be used as the UD field (i.e., user data field) of the SMS-SUBMIT message.

The message extractor 425 may extract the information from an SMS message. In some cases, the message extractor may extract the information from an SMS-DELIVER message. The SMS extractor 405 includes a payload extractor 430 and an origination address extractor 435.

The payload extractor 430 may extract the UD field of the SMS-DELIVER message and generate one or more data objects from the UD field of the SMS-DELIVER message. In some embodiments, the one or more data objects may be generated from the UD fields of multiple SMS-DELIVER messages. In some cases, the data object is a string of characters (up to 160 characters, for example). In other cases, the data object may be an image or a video clip. In yet other cases, the data object may be voice over IP (VOIP) data and/or session initiation protocol (SIP) data. Regardless of the data object, the payload extractor 430 may extract the information from one or more UD fields for reformatting and repackaging the information into one or more payloads of one or more generated communications.

The origination address extractor 435 may extract an origination address from an OA filed of the SMS-DELIVER message. The origination address may be the address of the originating SME.

The address matcher 440 may compare origination addresses determined by the origination address extractor 435 with a list of addresses that should be forwarded to another mobile device via second RAT. In some embodiments, the list of addresses that should be forwarded may be preselected. Additionally or alternatively, the list of addresses may that should be forwarded may be dynamically generated by storing (in the memory/storage 450, for example) destination addresses determined by the destination address extractor 415. When the origination address matches an address in the list of address that should be forwarded, the address matcher 440 may trigger on or more other modules, including the communication generator 445 to generate a communication for communicating the information to the other mobile device.

The communication generator 445 may generate one or more communications based on and using the information extracted from the message extractor 425. For example, the information extracted from the payload extractor 430 may be reformatted and restructured as one or more data objects within a payload section of the generated communication and the extracted origination address may be reformatted and restructured to be included in the generated communication.

Figure 5:
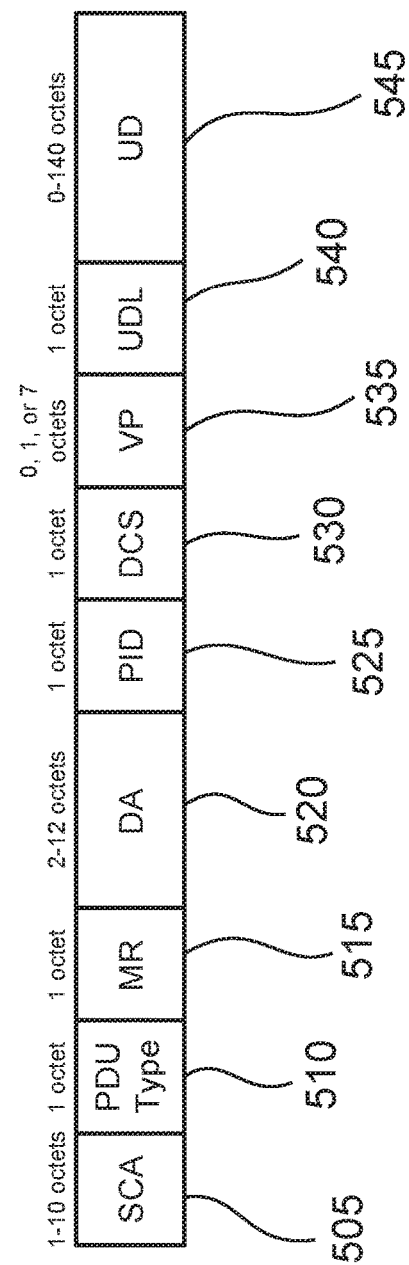
FIG. 5 is a block diagram illustrating one example of an SMS-SUBMIT message.

FIG. 5 is a block diagram illustrating one example of an SMS-SUBMIT message 500. The SMS-SUBMIT message 500 may be an example of the SMS-SUBMIT messages described previously. The SMS-SUBMIT message 500 includes a service center address (SCA) field 505, a protocol data unit (PDU) type field 510, a message reference (MR) field 515, a destination address (DA) filed 520, a protocol identifier (PID) field 525, a data coding scheme (DCS) field 530, a validity period (VP), a user data length (UDL) field 540, and a user data (UD) field 545. It is appreciated that the SMS-SUBMIT is used to send mobile originated SMS messages.

Figure 6:
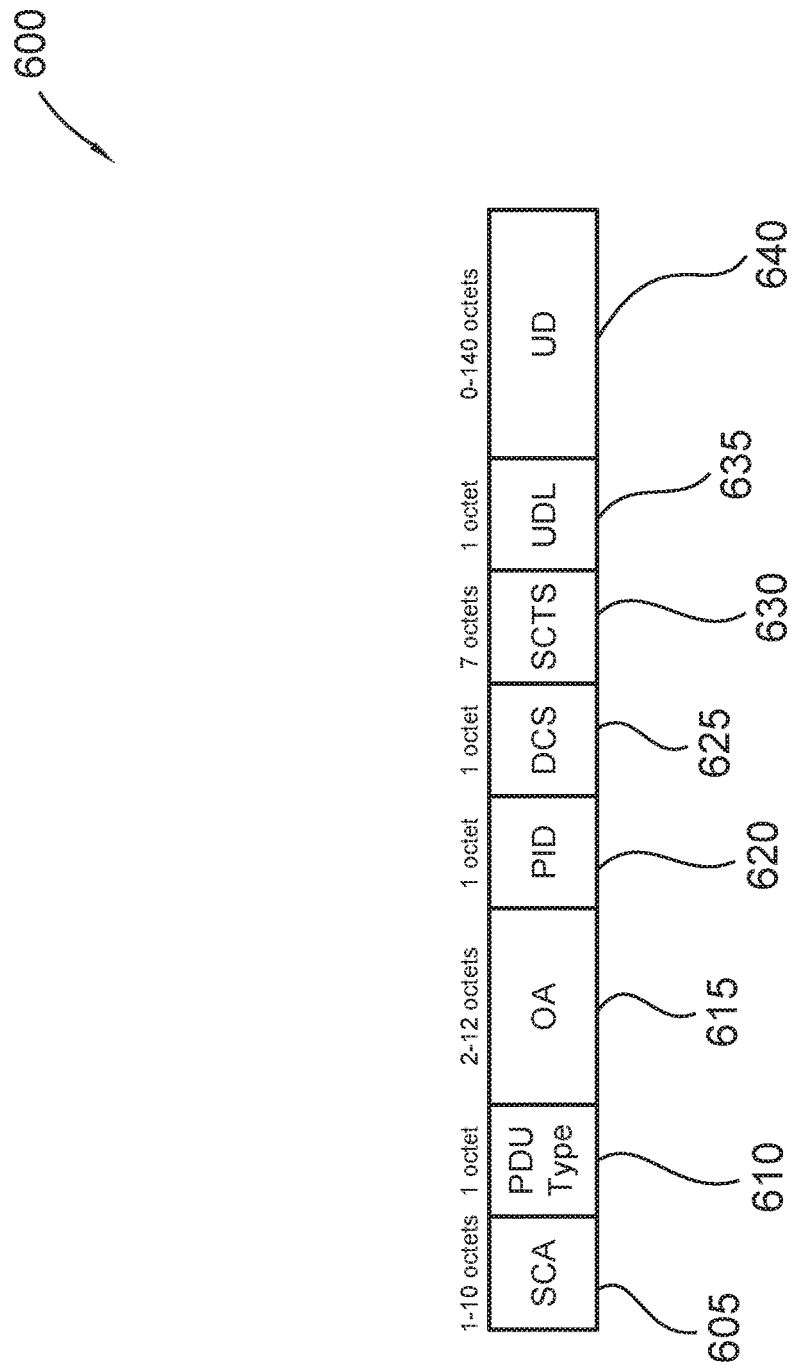
FIG. 6 is a block diagram illustrating one example of an SMS-DELIVER message.

FIG. 6 is a block diagram illustrating one example of an SMS-DELIVER message 600. The SMS-DELIVER message 600 may be an example of the SMS-DELIVER messages described previously. The SMS-DELIVER message 600 includes a service center address (SCA) field 605, a protocol data unit (PDU) type field 610, an origination address (OA) filed 615, a protocol identifier (PID) field 620, a data coding scheme (DCS) field 625, a service center time stamp (SCTS) field 630, a user data length (UDL) field 635, and a user data (UD) field 640. It is appreciated that the SMS-DELIVER is used to receive mobile terminated SMS messages.

Figure 7:
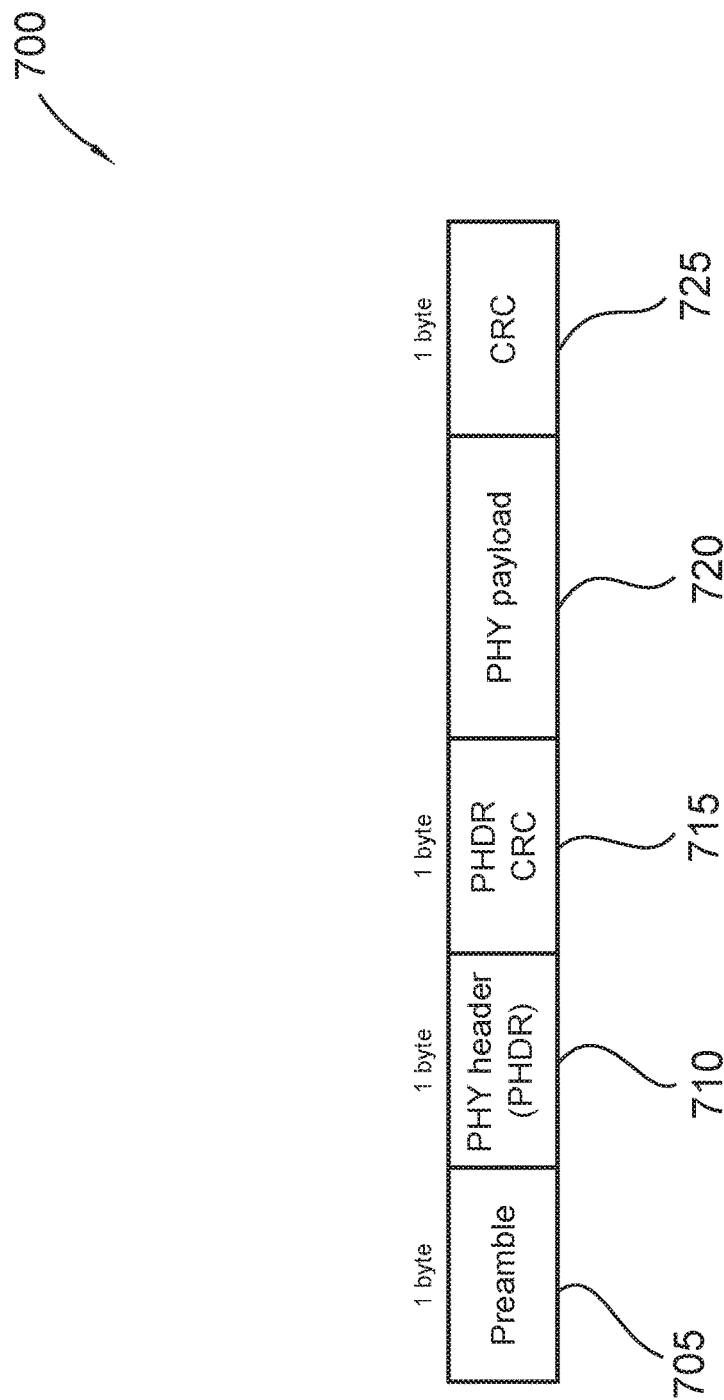
FIG. 7 is a block diagram illustrating one example of a LoRaWAN Radio PHY frame.

FIG. 7 is a block diagram illustrating one example of a LoRaWAN Radio PHY frame 700. The LoRaWAN Radio PHY message 700 includes a preamble 705, PHY header (PHDR) 710, a PHDR cyclic redundancy check (CRC) field 715, a PHY payload 720, and a CRC field 725.

In some embodiments, the communications described herein may be one or more LoRaWAN Radio PHY frames 700 that are packaged in a first/third RAT (e.g., Bluetooth, Wi-Fi) communication and sent directly as LoRaWAN Radio PHY frames 700 across the second RAT (e.g., 900 MHz based LoRaWAN RAT) via at least two bridging devices (e.g., 110-A, 110-B). Accordingly, the repackaging/reformatting may be between the SMS-SUBMIT message 500 or SMS-DELIVER message 600 (depending on the direction of flow of information, for example) and the LoRaWAN Radio PHY message 700. For example, the repackaging/reformatting may be between the PHY payload 720 and the respective UD field (i.e., SMS-SUBMIT UD field 545, SMS-DELIVER UD field 640).

Figure 8:
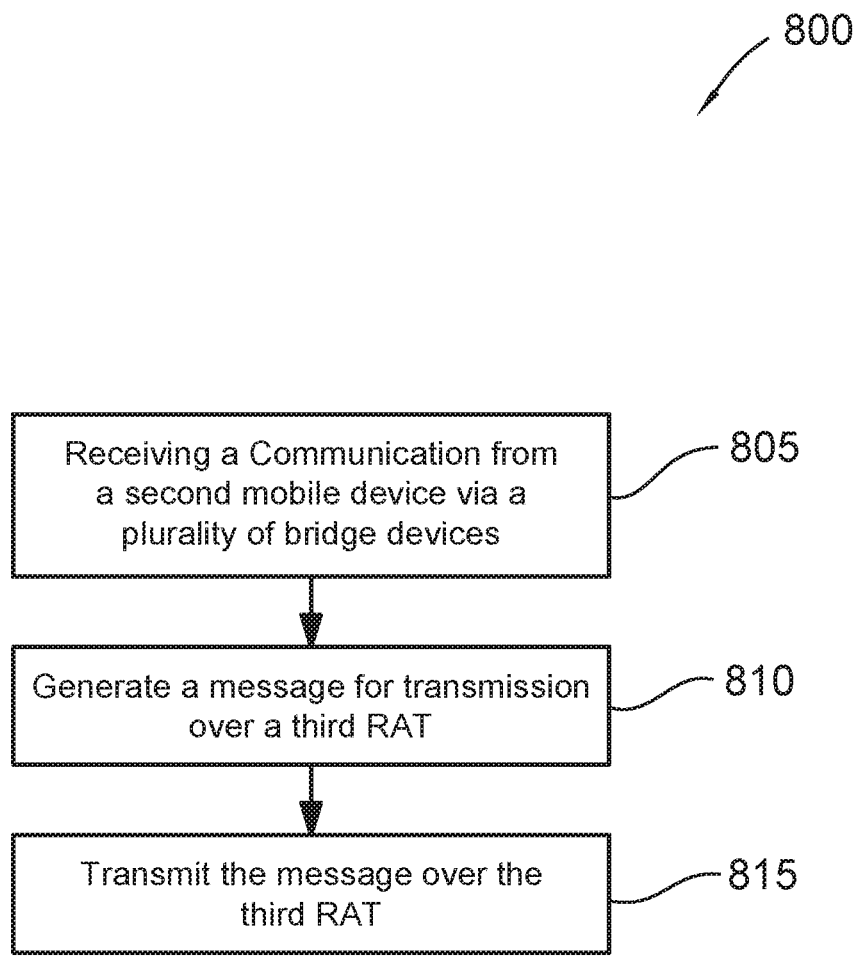
FIG. 8 is flow diagram illustrating one example of a method for bridging wireless communications.

FIG. 8 is flow diagram illustrating one example of a method 800 for bridging wireless communications. The method 800 may be implemented by a mobile device (e.g., mobile device 105) and more specifically by an application specific processor (e.g., processor 1010) included within the mobile device. At 805, a communication is received from a second mobile device via plurality of bridge devices. At 810, a message is generated for transmission over a third RAT. At 815, the message is transmitted over the third RAT.

Figure 9:
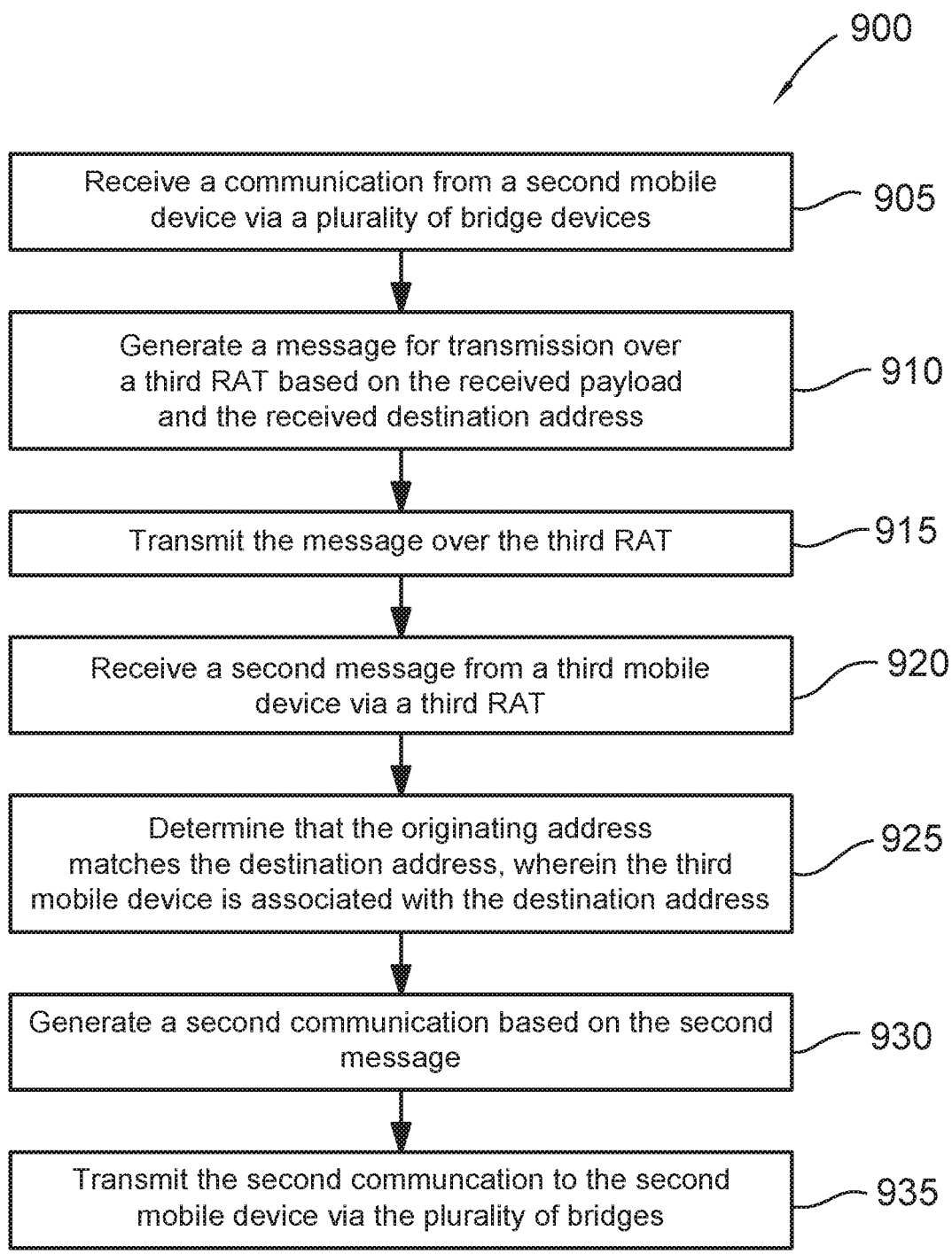
FIG. 9 is flow diagram illustrating another example of a method for bridging wireless communications.

FIG. 9 is flow diagram illustrating another example of a method 900 for bridging wireless communications. The method 900 may be implemented by a mobile device (e.g., mobile device 105) and more specifically by an application specific processor (e.g., processor 1010) included within the mobile device.

At 905, a communication is received from a second mobile device via plurality of bridge devices. At 910, a message is generated for transmission over a third RAT based on the received payload and the received destination address. At 915, the message is transmitted over the third RAT. At 920, a second message is received from third mobile device via a third RAT. At 925, a determination is made that the origination address matches the destination address, wherein the third mobile device is associated with the destination address. At 930, a second communication is generated based on the second message. At 935, the second communication is transmitted to the second mobile device via the plurality of bridges.

Figure 10:
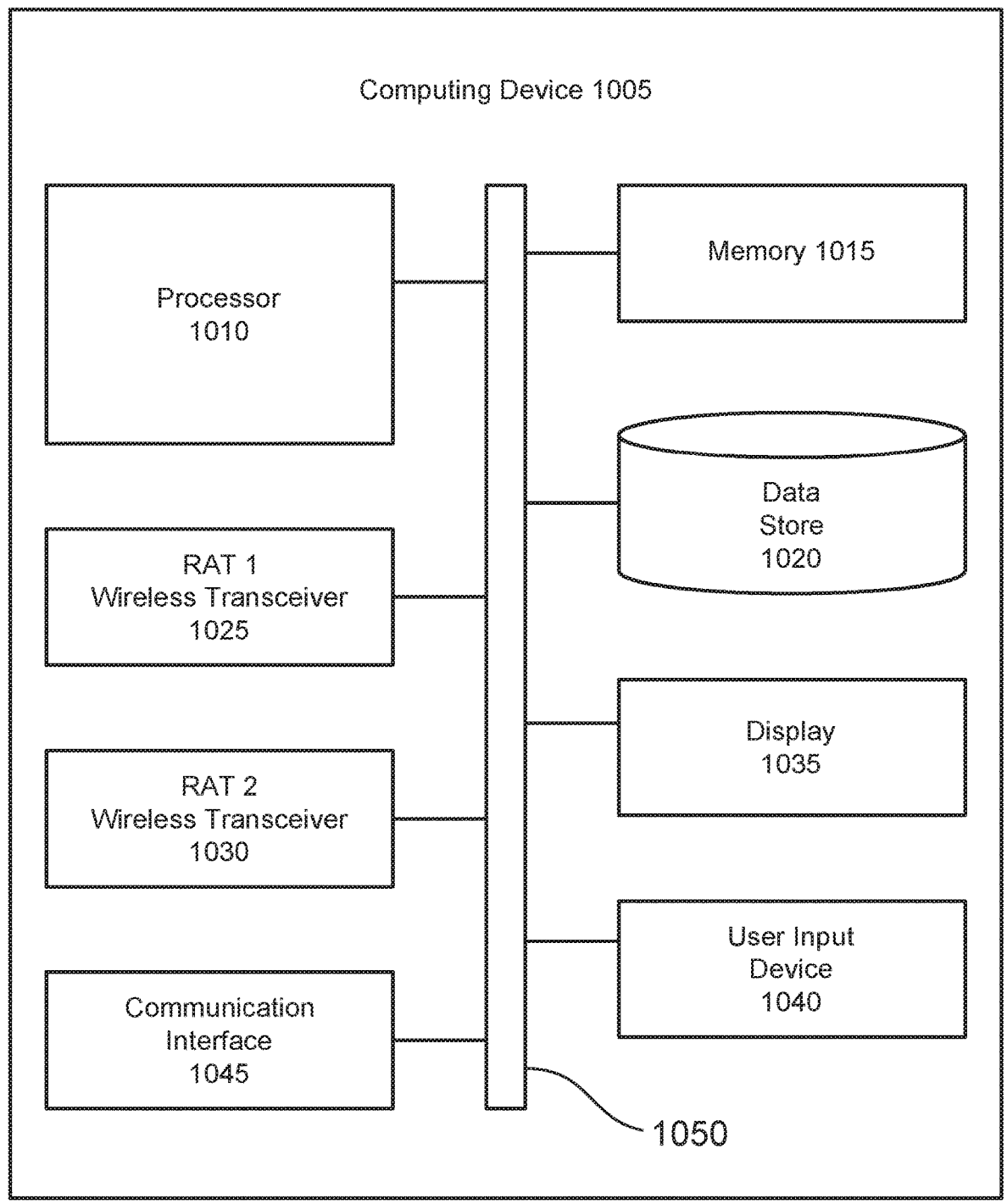
FIG. 10 is a block diagram of an exemplary computing device for implementing the described systems and methods.

FIG. 10 is a block diagram of a computing device 1005 for implementing the described systems and methods. In some embodiments, the mobile devices 105 (e.g., mobile device 105-A, 105-B) may be examples of the computing device 1005. In some embodiments, the bridge devices 110 (e.g., bridge device 110-A, 110-B) may be examples of the computing device 1005.

The computing device 1005 includes a processor 1010 (including a general-purpose processor and one or more application specific processors, for example), a wireless transceiver 1025 for communicating via a first RAT (e.g., 3G, 4G, LTE, 5G-NR, and/or LoRaWAN), a wireless transceiver 1030 for communicating via a second RAT (e.g., Bluetooth, Wi-Fi), a communication interface 1045 (e.g., serial interface, peripheral component interconnect express), a memory 1015 (e.g., random access memory (RAM), non-volatile RAM (NVRAM)), data store 1020 (e.g., hard disk drive, solid state disk), an optional display 1035 for interfacing with a user, a user input device 1040 (e.g., touch input, mouse, keyboard, pen input), and an interconnect or but 1050 for interconnecting each of the components 1010-1040.

In some embodiments, the memory 1015 and/or the data store 1020 (each being a non-transitory storage medium, for example) may store instructions that are executable by the processor 1010 to implement the systems and methods described herein. For example, the instructions may be executable by the processor 1010 to implement any of the methods (e.g., method 800 and/or method 900).

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for bridging wireless communications, comprising:
    a base station for a first radio access technology (RAT), wherein the base station provides a coverage area of the first RAT;
    a first mobile device that is outside the coverage area of the first RAT, wherein the first mobile device comprises a first radio for communicating via the first RAT and a second radio for communicating via a second RAT;
    a second mobile device that is within the coverage area of the first RAT, wherein the second mobile device comprises a first radio for communicating with the base station via the first RAT and a second radio for communicating via a fourth RAT, and wherein the first RAT is different than the fourth RAT;
    a first bridging device that comprises a first radio for communicating with the second RAT and a second radio for communicating with a third RAT, wherein the third RAT is different than the first RAT and the second RAT, and wherein the first bridging device communicates with the first mobile communication device using the second RAT; and
    a second bridging device that comprises a first radio for communicating with the fourth RAT and a second radio for communicating with the third RAT, wherein the third RAT utilizes a 900-Megahertz (MHz) frequency band, wherein the third RAT is different than the first RAT and the fourth RAT, and wherein the second bridging device communicates with the first bridging device using the third RAT and communicates with the second mobile device using the fourth RAT,
    whereby the first mobile device communicates with the base station via the first bridging device, the second bridging device, and the second mobile device.

2. The system of claim 1 wherein the third RAT is LoRaWAN.

3. The system of claim 1, wherein the first RAT comprises a wide area network technology, wherein the wide area network technology is at least one of 3G, 4G, LTE, LTE-Advanced, and 5G NR.

4. The system of claim 1, wherein the second RAT and the fourth RAT are a same RAT, and wherein the same RAT is Bluetooth.

5. A method for bridging wireless communications, comprising:
    receiving, by a first mobile device, a first radio access technology (RAT) message via a first RAT from one of a plurality of bridge devices, wherein the plurality of bridge devices communicate with each other via a second RAT, wherein the second RAT utilizes a 900 MHz band, wherein the first RAT is different than the second RAT, and wherein the first RAT message comprises a communication from a second mobile device that was sent via the plurality of bridge devices, the communication comprising a payload and a destination address;
    generating a third RAT message for transmission to a base station via a third RAT based on the received payload and the received destination address included in the first RAT message, wherein the third RAT is different than that first RAT and the second RAT; and
    transmitting the third RAT message to the base station via the third RAT.

6. The method of claim 5, wherein the first mobile device is within a coverage area of the third RAT provided by the base station, and wherein the second mobile device is outside of the coverage area of the third RAT.

7. The method of claim 5 further comprising:
    receiving a second third RAT message from a third mobile device via the base station, the second third RAT message comprising a payload and an originating address;
    determining that the originating address matches the destination address, wherein the third mobile device is associated with the destination address;
    generating a second first RAT message for transmission to the one of the plurality of bridge devices via the first RAT, wherein the second first RAT message comprises a communication for the second mobile device, and wherein the communication is based on the second first RAT message; and
    transmitting the second first RAT message to the one of the plurality of bridge devices via the first RAT, wherein the communication is communicated to the second mobile device via the plurality of bridge devices.

8. The method of claim 5, wherein the third RAT message is at least one of a short message service (SMS) message, a multimedia message service (MMS) message, a rich communications services (RCS) message, and an iMessage service.

9. The method of claim 5, wherein the first RAT is Bluetooth.

10. The method of claim 5, wherein the second RAT is LoRaWAN.

11. The method of claim 5, wherein the third RAT is at least one of 3G, 4G, LTE, and 5G NR.

12. The method of claim 5, wherein the payload has a maximum size of 140 octets.

13. A mobile device for bridging wireless communications, comprising:
    a processor; and
    memory in electronic communication with the processor, the memory storing instructions that when executed by the processor, cause the processor to:
    receive a first radio access technology (RAT) message via a first RAT from one of a plurality of bridge devices, wherein the plurality of bridge devices communicate with each other via a second RAT, wherein the second RAT utilizes a 900 MHz band, wherein the first RAT is different than the second RAT, and wherein the first RAT message comprises a communication from a second mobile device that was sent via the plurality of bridge devices, the communication comprising a payload and a destination address;
    generate a third RAT message for transmission to a base station via a third RAT based on the received payload and the received destination address included in the first RAT message, wherein the third RAT is different than that first RAT and the second RAT; and transmit the third RAT message to the base station via the third RAT.

14. The mobile device of claim 13, wherein the mobile device is within a coverage area of the third RAT provided by the base station, and wherein the second mobile device is outside of the coverage area of the third RAT.

15. The mobile device of claim 13, wherein the instructions are further executable by the processor to:

receive a second third RAT message from a third mobile device via the base station, the second third RAT message comprising a payload and an originating address;

determine that the originating address matches the destination address, wherein the third mobile device is associated with the destination address;

generate a second first RAT message for transmission to the one of the plurality of bridge devices via the first RAT, wherein the second first RAT message comprises a communication for the second mobile device, and wherein the communication is based on the second first RAT message; and transmit the second first RAT message to the one of the plurality of bridge devices via the first RAT, wherein the communication is communicated to the second mobile device via the plurality of bridge devices.

16. The mobile device of claim 13, wherein the third RAT message is at least one of a short message service (SMS) message, a multimedia message service (MMS) message, a rich communications services (RCS) message, and an iMessage service.

17. The mobile device of claim 13, wherein the payload has a maximum size of 140 octets.

\* \* \* \* \*